United States Patent [19]

Aguilo et al.

[11] 3,859,336

[45] Jan. 7, 1975

[54] PROCESS FOR THE PRODUCTION OF GLYCOL ESTERS

[75] Inventors: Adolfo Aguilo; Arthur W. Schnizer, both of Corpus Christi, Tex.

[73] Assignee: Celanese Corporation, New York, N.Y.

[22] Filed: Apr. 15, 1966

[21] Appl. No.: 542,747

Related U.S. Application Data

[63] Continuation-in-part of Ser. No. 223,536, Sept. 13, 1962, abandoned.

[52] U.S. Cl. ... 260/497 A, 260/488 R, 260/488 CD, 260/496
[51] Int. Cl. ............................................ C07c 67/04
[58] Field of Search ................................ 260/497 A

[56] References Cited

FOREIGN PATENTS OR APPLICATIONS 628,733   8/1963   Belgium .......................... 260/497 A Primary Examiner—Lorraine A. Weinberger
Assistant Examiner—Richard D. Kelly
Attorney, Agent, or Firm—Michael G. Gilman; Abner Sheffer; Ralph M. Pritchett

[57] ABSTRACT

A process for the preparation of vicinal glycol esters which comprises reacting an alkanoic acid with an olefin in the presence of a palladium catalyst and a nitrate-nitrite oxidation carrier.

5 Claims, No Drawings

PROCESS FOR THE PRODUCTION OF GLYCOL ESTERS

This is a continuation-in-part of application Ser. No. 223,536, filed Sept. 13, 1962, now abandoned.

This invention relates to the oxidation of olefins. It more particularly refers to the catalytic oxidation of olefins to form hydroxyl compounds or derivatives thereof (e.g., esters).

It is known that olefins can be catalytically oxidized to form carbonyl compounds. In this regard Luxembourg Pat. No. 36,201 has an excellent dissertation on the oxidation of olefins to carbonyl compounds, as does the Jan. 6, 1962 issue of Chemistry and Industry. According to these references, olefins are reacted with water; oxygen; an oxidation carrier, e.g., a reoxidant; and a noble metal salt to produce aldehydes, ketones or acids.

It has now been found that olefins can be oxidized to hydroxyl compounds or derivatives thereof, e.g., unsaturated esters, vicinal glycol esters and gem diol esters, through the use of a noble metal catalyst, an oxidation carrier and oxygen, provided that the reaction system is maintained in a substantially non-aqueous condition in the presence of a carboxylic acid. According to this invention, substantially non-aqueous is intended to mean less than about 20 percent by weight of water. The reaction system should contain a carboxylic acid, acid anhydride or both, preferably a saturated aliphatic carboxylic acid or acid anhydride. Where both acid and acid anhydride are present, it is desirable but not essential that the acyloxy groups of each be the same.

More specifically, this invention includes the overall reaction of olefins with oxygen in a substantially non-aqueous environment in the presence of a noble metal ion catalyst and a redox system oxidation carrier to form hydroxyl compounds or derivatives thereof.

Substantially, any olefin is operable in this invention provided that the olefin has a structure so that no steric hindrance is offered to the reaction and provided further that any other functional groups contained in the olefin molecule are not so near the point of unsaturation as to encourage side reaction, e.g., alpha-beta unsaturated carboxylic acids will tend to decarboxylate under oxidation conditions rather than oxygenate the unsaturation as desired in this invention. Exemplary olefins include alpha olefins such as ethylene, propylene, butene-1, octene-1, etc., dienes such as butadiene and cyclopentadiene; unsaturated acids such as oleic, linoleic and linolenic; ethers such as allyl methyl ether; and aromatics such as styrene. It is desirable in all cases that the olefin being oxidized according to this invention have at least one hydrogen atom attached to each of the carbon atoms constituting the olefinic unsaturation. The position of the added oxygen in the product according to this invention will be determined by Markonikov's rule, e.g., propylene will be oxidized to esters of 1, 2-propylene glycol, isopropenol to isopropylidene diol. Olefins oxidized according to this invention may be normally liquid or gaseous as the case may be.

It is desirable to utilize noble metal ion catalysts in the practice of this invention. Salts of metals of Group VIII of the Periodic Table, e.g., platinum, palladium, rhodium, iridium, ruthenium and combinations thereof, have been found to be effective catalysts. The anion of the noble metal salt can be substantially any moiety. It may in some cases be a valuable component of the reaction system and then again it may be substantially inert in the system, acting merely as a vehicle for getting the required noble metal ions into the reaction system. Thus, noble metal chlorides, bromides and iodides are operable here as are nitrates, acetates and arsenates for example. It is also within the scope of this invention to introduce the catalyst noble metal into the reaction system in the elementary state, that is by dissolving directly into the reaction system containing an appropriate oxidation carrier.

The concentration of noble metal ion catalyst is suitably at least about $10^{-3}$ Molar. It is preferred to utilize about $10^{-3}$ to 1 Molar solutions of palladium$^{II}$ or rhodium$^{III}$ ions.

The oxidation carrier according to this invention is suitably a redox system. Examples of various redox systems for use in this invention include multivalent metals which are at least monovalent in the reduced state, e.g., copper, iron, cerium, vanadium, chromium, molybdenum, manganese, nickel, cobalt and thallium. Included as oxidation carriers are anion and compound redox couples, e.g., nitrate-nitrite, arsenate-arsenite, iodine-iodide, azobenzene-hydrazobenzene and quinone-hydroquinone. The oxidation carrier can be provided to the reaction system in the form of a salt, e.g., copper chloride and/or acetate, or as a combination of two or more redox systems, for example, copper chloride and p-benzoquinone or cupric and nitrate ions. Also included as useful oxidation carriers are various precursors of the redox systems referred to herein which in the reaction system described are converted to a suitable oxidation carrier, e.g., nitric acid, nitric oxide and nitrogen dioxide will all provide nitrate-nitrite redox couple in the described reaction systems.

It is preferred in the process of this invention to use copper, iron, nitrate-nitrite or quinone-hydroquinone oxidation carriers. The concentration of oxidation carrier is generally from about 0.1 Molar up to the limit of solubility, preferably about 0.2 to 1.0 Molar. The quantity of oxygenated product (hydroxyl compound and derivatives) may in some cases bear a direct stoichiometric relation to the concentration of oxidation carrier present in the reaction system. In these cases, e.g., when the system is operated in cycles, it is advantageous to utilize as much oxidation carrier as practical.

The preferred primary oxidant in the instant invention is oxygen. The oxygen can be obtained from substantially any suitable source. Thus air, molecular oxygen, air enriched with oxygen or oxygen diluted with inert gases are all practical sources of oxygen. Any one or more of these sources of oxygen can be used in this invention. Additionally, it may in some cases be practical to utilize organic or inorganic oxidants, such as p-benzoquinone, potassium dichromate, potassium permanganate, or any of the oxidation carriers set forth above, either instead of or in addition to oxygen as the primary oxidant. As a practical matter air is the preferred primary oxidant because it is readily available and low in cost.

It is necessary in the practice of this invention to utilize a substantially non-aqueous reaction medium. As set forth above, only up to about 20 percent water is tolerable in the reaction medium where hydroxyl compound derivatives are to be produced. The reaction medium may have several constituents. A particularly useful reaction medium is a saturated carboxylic acid.

Preferably lower alkyl acids are used, e.g., acetic acid, propionic acid, butyric acid, caproic acid, etc.

It is within the scope of this invention to use a mixed reaction medium, suitably an aliphatic acid and another saturated organic compound such as dioxane, tetrahydrofuran or N,N-dimethyl acetamide. It is usually advantageous to provide a dehydrating agent in the reaction medium in order to control the water thereof to a desired level. Carboxylic acid anhydrides have been found to be particularly well suited to this use. It is preferred to provide aliphatic carboxylic acids and anhydrides having the same acyloxy radical, since this simplifies purification of the reaction mixture after the reaction is terminated.

Where vicinal glycol esters are being produced, the ratio of diester to monoester is influenced by the presence of acid anhydride in the reaction system. Generally a high ratio of acid anhydride to acid results in an increased ratio of diester to monoester.

In the alternative, the quantity of water present in the reaction medium can be controlled by ordinary distillation techniques or by azeotropic distillation with azeotroping agents, such as toluene or benzene, or by the use of inorganic desiccants such as silica gel or calcium chloride.

It has been found that the product distribution is strongly influenced by the EMF (potential) of the reaction medium. In the oxidation of ethylene where the EMF is about 300 to 550 millivolts, as measured between a platinum electrode and a saturated calomel electrode at 75°C, unsaturated esters or gem diol esters are the principal products. Where the EMF is about 400 to 550 millivolts or higher, the principal products are vicinal glycol esters. As will be appreciated, the range of about 400 to 550 millivolts overlaps both product groups. Other parameters must be considered to determine the product to be expected in this EMF range.

The desired product, i.e., vicinal glycol esters or unsaturated esters, of the process described herein influences the tolerability of the system to water.

Where vicinal glycols, e.g., 1, 2-propylene glycol, are the desired product, the reaction medium may contain up to as much as about 20 percent but it is preferred to operate at less than about 5 percent water. Where unsaturated esters or gem diol esters are the desired product, the reaction mixture may contain only up to about 5 percent water but it is preferred to operate at less than about 2 percent water.

In the practice of this invention, it has been found to be quite convenient in some instances to provide halide ions, e.g., chloride, bromide and iodide, in the reaction medium. These anions have the property of increasing the rate of in situ regeneration of the noble metal ion catalyst. This is particularly true where palladium ions are the noble metal catalyst and copper is the oxidation carrier. The proportion of halide ion present in the reaction medium may be from zero to the limit of solubility, e.g., up to 2 Molar, but preferably is from about 0.1 to 0.5 Molar, for unsaturated ester and gem diol diester production, and about 0.5 to 2 Molar for vicinal glycol production. The halogens are preferred in order of decreasing atomic weight. In addition, and possibly more important, the halide ion concentration has a marked effect on the distribution of products obtained by the practice of this invention. Thus, low halide ion concentrations favor the production of unsaturated esters and gem diol esters whereas high halide ion concentration favors the production of vicinal glycol esters.

In the specific instance where ionic palladium is the primary catalyst, copper is the oxidation carrier and chloride is the salt forming anion, it has been found that a ratio of chloride to cupric ions less than 1, e.g., 0.25 to 1, is especially well suited to the production of unsaturated esters and gem diol esters. In this same system, it has been found that a ratio of chloride to cupric ions greater than 1, e.g., 1 to 4, is especially well suited to the production of vicinal glycols. It will, of course, be understood that the particular ratios may vary from the values set forth herein where the specific halide, oxidation carrier or noble metal is altered. One notable exception has been found to these principles. The course of the reaction does not seem to be altered or influenced by the concentration of halide ion in the reaction medium where nitrate-nitrite redox couple is the oxidation carrier.

As was stated above, it is desirable in the practice of this invention to add acyloxy groups to the reaction medium particularly where unsaturated esters are the desired products. It has been found that these acyloxy groups can be advantageously introduced as acid salts, e.g., with metals of Groups I or II of the Periodic Table. Of particular interest are the lithium, sodium or strontium salts of lower aliphatic carboxylic acids having up to about seven carbon atoms or more. The molecular weight and number of carbon atoms in the acyloxy group does not appear to be of major significance. Choice of any specific acyloxy group would then seem to depend upon availability of the corresponding acid or salt and upon the desired ester end product. If the ultimate desired end product is an hydroxyl terminated compound, the choice of acyloxy group is determined by cost, ease of handling, ease of hydrolysis of the ester product and convenience of recovery of the acyloxy group. It is of course within the scope of this invention to introduce the appropriate acyloxy group as a salt of the oxidation carrier where the oxidation carrier is a cation, e.g., copper. Acyloxy groups can be present in the reaction mixture in substantially any proportion up to the limit of solubility. Concentrations up to about 5 Molar are convenient, preferably about 0.5 to 1 Molar when vicinal glycols are to be produced, and about 1 to 5 Molar whose unsaturated esters and gem diol diesters are to be produced.

In general, the presence of acyloxy groups in the reaction medium tends to increase the solubility of many of the oxidation carriers which are useful in the process of this invention, notably of copper salts. In some cases, particularly where nitrate-nitrite redox couple is the oxidation carrier, it is not necessary to use acyloxy groups as a solubility aids but it is still quite desirable to provide such groups in appropriate proportions to influence the product distribution. Thus, where palladium is the noble metal catalyst and copper is the oxidation carrier, high added acyloxy concentration favors production of unsaturated esters and gem diols, while no or low added acyloxy concentration favors production of vicinal glycols. The ratio of acyloxy groups to halide ions is a convenient determinant of the product which will predominate when this invention is practiced. Thus, where the acyloxy to halide ratio is less than about 10, vicinal glycols will be the predominant product; whereas if the acyloxy to halide ratio is about 10 or higher, gem diols and unsaturated esters will predominate.

According to this invention, olefins can be oxidized to hydroxyl compounds or derivatives thereof using the reaction constituents set forth above. Atmospheric, sub and super-atmospheric pressures are operable. It has been determined that the use of super-atmospheric pressures will increase the rate of reaction. The partial pressures of oxygen and the olefin being oxidized have an effect on product distribution. For example, in a reaction system where ionic palladium is the primary catalyst, copper is the oxidation carrier and oxygen is the oxidant and where the reaction is continuous in one vessel, high partial pressures of oxygen favor the production of vicinal glycol esters while low partial pressures of oxygen favor the production of gem diol esters or unsaturated esters.

The process of this invention is suitably carried out at about 0° to 200°C, preferably about 50° to 150°C. Suitable operating temperatures and pressures must be determined together since each has a relation to the other. Thus, operating at atmospheric pressure and 60° to 80°C has been found to be particularly well suited to the practice of this invention.

Oxidation of olefins according to this invention can be carried out either continuously or batchwise but it is preferred to operate continuously. It is also within the scope of this invention to employ a one stage or a two stage process as desired. In the one stage process, a solution of catalyst and oxidation carrier in a substantially non-aqueous solvent is charged to a reactor to which the olefin to be oxidized and the oxidant (e.g., oxygen) are then fed. The olefin is oxidized to suitable hydroxyl derivatives and the catalyst is regenerated in situ as it becomes exhausted. The reaction mixture is continuously removed and separated into its various components with the hydroxyl derivative products then being purified by conventional techniques and the catalyst and oxidation carrier solution recycled to the oxidation reactor. This one stage process is particularly desirable for vicinal glycol ester production. In the two stage process, a solution of catalyst and oxidation carrier in a substantially anhydrous solvent is charged to a reactor to which the olefin to be oxidized is then fed. The olefin is oxidized to hydroxyl derivatives and the reaction mixture is then separated into its components with the hydroxyl derivative products purified by conventional means. The spent catalyst and oxidant carrier solution is fed to a regenerator where an oxidant (e.g., oxygen) is reacted therewith to oxidize the spent catalyst and oxidation carriers back to their original oxidation state. The regenerated catalyst and oxidation carrier are then reintroduced (recycled) to the reactor. This two stage process is particularly desirable for unsaturated ester and gem diol ester production.

Another embodiment of this invention includes a vapor phase process for oxidizing olefins to hydroxyl compounds or derivatives thereof. In this embodiment an olefin-oxidant mixture is saturated with the substantially anhydrous solvent and is contacted with a bed of solid catalyst at an appropriate temperature, as set forth above. The catalyst is regenerated either in situ or separately as it becomes spent and loses its activity.

EXAMPLE I

Vinyl acetate was prepared as follows: A glacial acetic acid solution 1 Molar in lithium acetate, 0.38 Molar in lithium chloride, and 0.62 Molar in acetic anhydride was heated to 120°C for 15 minutes with 0.0062 moles of rhodium trichloride to make the solution 0.206 Molar in rhodium trichloride. An identical glacial acetic acid solution was heated to 80°C for 30 minutes with 0.0248 moles of ferric chloride to make the solution 0.311 Molar in ferric chloride. Forty cubic centimeters of the above ferric chlorice solution and 8 cubic centimeters of the above rhodium trichloride solution were mixed together and a mixture of ethylene and oxygen in a mole ration of 2 to 1 at a temperature of 115°C and at atmospheric pressure was bubbled through the catalyst solution for 17.5 hours. During this time 580 cubic centimeters of ethylene and 540 cubic centimeters of oxygen were consumed and 2.8 grams of liquid was collected in traps through which the exit gas was cooled. The liquid was an acetic acid solution which contained: 7.05 weight percent vinyl acetate, 4.18 weight percent acetaldehyde and 4.83 weight percent acetaldehyde and 4.83 weight percent paraldehyde.

EXAMPLE II

A solution of galcial acetic acid 1 Molar in lithium acetate and 0.62 Molar in acetic anhydride was boiled for 20 minutes with 0.0103 moles of magnesium nitrate hexahydrate to form a 1.03 Molar solution thereof. A solution of glacial acetic acid 0.094 Molar in palladium dichloride, 1 Molar in lithium acetate and 0.62 Molar in acetic anhydride was mixed with the above magnesium nitrate solution in a ratio of 1 volume of palladium chloride solution to 20 volumes of magnesium nitrate solution; and a gas mixture of ethylene and oxygen in a mole ratio of 2 to 1 was bubbled through the mixed solution at 60°C and atmospheric pressure until 750 parts by volume of the gas mixture was absorbed. The product was an acetic acid solution containing 3.9 percent ethylene glycol diacetate, 2.3 percent ethylene glycol monoacetate, 0.1 percent ethylidene diacetate and a trace of vinyl acetate.

EXAMPLE III

A catalyst solution of 44 cubic centimeters of glacial acetic acid solvent 0.0085 Molar in palladium dichloride, 0.21 Molar in cupric chloride, 0.8 Molar in lithium acetate, and 0.62 Molar in acetic anhydride was utilized in this run. A gas mixture of ethylene and oxygen (1 to 1 mole ratio) was bubbled through the catalyst solution for 190 minutes during which time 405 cubic centimeters of gas mixture was absorbed. The products recovered were ethylene glycol mono and diacetates, ethylidene diacetate and small amounts of vinyl acetate and acetaldehyde.

EXAMPLE IV

The catalyst solution used in this run was exactly that of Example III except that the solution was 0.21 Molar in p-benzoquinone in place of the cupric chloride and the lithium acetate was present in 1 Molar concentration. Ethylene gas at 60°C and 1 atmospheric pressure was bubbled through the catalyst solution for 41 minutes during which time 154 cubic centimeters were absorbed. The reaction product was an acetic acid solution 0.13 Molar in vinyl acetate with 0.01 Molar in acetaldehyde.

EXAMPLE V

A catalyst solution of glacial acetic acid solvent was prepared which was 0.0085 Molar in palladium dichloride, 0.12 Molar in cupric acetate, 0.5 Molar in lithium acetate, 0.3 Molar in acetic anhydride and 0.12 Molar in lithium chloride. Ethylene at 60°C and atmospheric pressure was bubbled through the catalyst solution until 76 cubic centimeters thereof was absorbed. The product was 81.8 percent vinyl acetate and 18.2 percent acetaldehyde.

EXAMPLE VI

A catalyst solution was made in the following manner: 300 parts of $Cu(OAc)_2 \cdot H_2O$, 330 parts of $LiOA_c$, 5 parts of $PdCl_2$, 9.5 parts of lithium chloride, 304 parts of acetic anhydride, and 2360 parts of acetic acid were mixed and heated under reflux. The calculated composition of this solution was: $Cu(OAc)_2$, 0.5 Molar; total $AcO^-$, 3.0 Molar; total $Cl^-$, 0.1 Molar; $(AC)_2O$, 0.55 Molar; $Pd^{++}$, $10^{-2}$ Molar. Ethylene was allowed to react with the solution at 75°C and atmospheric pressure. After the reaction with ethylene, vinyl acetate and acetaldehyde were separated from the catalyst by distillation and the catalyst solution was regenerated with oxygen. Fresh ethylene was subjected to oxidation in the same environment under identical conditions. The process was repeated three times. The amount of ethylene reacted was 0.204, 0.308, and 0.254 moles in the first, second and third cycles. The product yields based upon ethylene were: first cycle, vinyl acetate 68.5 percent; second cycle, vinyl acetate 54.5 percent; third cycle, vinyl acetate 77.0 percent. The recovery of vinyl acetate in the distillations was higher than 90 percent.

EXAMPLE VII

To the catalyst solution of Example VI, 11.9 parts more of lithium chloride was added to increase the chloride concentration to 0.2 Molar. Three cycles of ethylene oxidation, product separation and catalyst regeneration identical to that described in Example VI above were made. Reactions were carried out at 75°C and atmospheric After the reaction with ethylene, vinyl acetate was separated from the catalyst solution by distillation and the catalyst solution was regenerated with oxygen. After this, ethylene was reacted again and the operation of olefin oxidation, product separation, and catalyst regeneration was repeated three times. The amount of ethylene reacted was 0.21, 0.21 and 0.19 moles per liter in the first, second and third cycles. The product yields in ethylene were: first cycle, vinyl acetate 52.4 percent, ethylidene diacetate 14.3 percent; second cycle, vinyl acetate 47.5 percent, ethylidene diacetate 20.0 percent; third cycle, vinyl acetate 36.9 percent, ethylidene diacetate 25.8 percent. The recovery of vinyl acetate in the distillations was higher than 90 percent. During reaction, the EMF was measured at 480 to 50 millivolts.

EXAMPLE VIII

A glacial acetic acid solution was prepared having the following composition:

| | |
|---|---|
| $PdCl_2$ | $10.7 \times 10^{-3}$ moles per liter |
| $CuCl_2$ | 0.28 moles per liter |
| Strontium acetate | 0.24 moles per liter |
| Strontium chloride | 0.009 moles per liter |
| Acetic anhydride | 0.3 moles per liter |
| Sodium acetate | 0.025 moles per liter |

To this solution an ethylene-oxygen mixture in a ratio of 2:1 was bubbled through the solution at 60°C and 1 atmosphere pressure. The measured EMF of the solution at the outset was 650 millivolts as measured between a platinum electrode and a saturated calomel electrode at 75°C. The reaction was terminated after about 5 hours during which time 1,400 ml of gas were absorbed. Analysis of the solution showed the following:

| | |
|---|---|
| Ethylene glycol monoacetate | 7.8 wt. % |
| Ethylene glycol diacetate | 1.3 wt. % |
| Ethylidene diacetate | 0.2 wt. % |
| Vinyl acetate | 0.0 wt. % |

It is within the scope of this invention to produce esters by the processes described herein. It is also within the scope of this invention to hydrolyze the gem diol esters and/or vicinal glycol esters to produce the corresponding alcohols.

The foregoing specification has described a process for producing vicinal glycols and the mono and diesters thereof, which is the invention of Adolfo Aguilo. Also described in the foregoing specification is a process for producing unsaturated esters and gem diol esters which is the invention of Arthur Wallace Schnizer and Adolfo Aguilo and is discussed and claimed in a separate application filed concurrently herewith.

Having described our invention what is claimed and desired to be secured by Letters Patent is:

1. A process for the preparation of vicinal glycol acetate which comprises passing ethylene and an oxygen-containing gas into intimate contact with a solution containing less than about 20 percent water and consisting essentially of palladium and copper ions derived from their chloride salts, strontium chloride, strontium acetate, and sodium acetate in a solvent containing a major amount of acetic acid at a temperature of about 60° to 80°C at about atmospheric pressure, the system having a potential of at least 400 millivolts, said solution having an acetoxy to chloride ratio of less than about 10 and a chloride to copper ratio of about 1 to 4; and separating vicinal glycol acetate from said solution.

2. A process for the preparation of vicinal glycol esters which comprises mixing an olefin which has at least one hydrogen atom attached to each olefinically-unsaturated carbon atoms with a solution containing less than about 20 percent water and comprising a saturated lower alkanoic acid, a palladium metal ion catalyst in at least about $10^{-3}$ molar concentration, lower aliphatic carboxylic acloxy groups in a concentration of about 0.5 to 1 molar, and a nitrate-nitrite oxidation carrier which is capable of oxidizing the palladium metal catalyst as it is reduced during the course of the reaction and which has been introduced into said solution in such quantity that the resulting concentration of nitrate and nitrite ions is at least about 0.1 molar, and reacting said olefin with said lower alkanoic acid in said solution in the presence of oxygen at a temperature between 0°C and 200°C.

3. A process for perparing vicinal glycol esters which comprises mixing an olefin which has at least one hydrogen atom attached to each olefinically-unsaturated carbon atom with an acetic acid solution, containing less than about 20 percent water, comprising a palladium ion catalyst at least about $10^{-3}$ molar in palladium content and a nitrate-nitrite oxidation carrier capable of oxidizing the palladium catalyst as it is reduced during the course of reaction, said oxidation carrier being introduced into said solution in the form of a source of nitrate ions in such quantity that the resulting concentration of nitrate and nitrite ions in said solution is at least about 0.1 molar; and subjecting said olefin to chemical reaction with said solution in the presence of molecular oxygen at about 50° to 150°C.

4. The process of claim 3 wherein said solution consists essentially of acetic acid containing lithium acetate in about 1 molar concentration, nitrate ions in about 1 molar concentration, and palladium dichloride in about 0.005 molar concentration prior to introducing the olefin and oxygen thereinto.

5. A process for preparing vicinal glycol esters which comprises mixing ethylene with a solution containing a palladium ion catalyst, lithium acetate, palladium dichloride, and a nitrate-nitrite oxidation carrier and subjecting said ethylene to chemical reaction with said solution in the presence of molecular oxygen at about 50°C to 150°C, said solution, prior to introducing the ethylene and oxygen thereinto, consisting essentially of acetic acid containing lithium acetate in about 1 molar concentration, nitrate ions in about 1 molar concentration which have been introduced into said solution as magnesium nitrate, and palladium dichloride in about 0.005 molar concentration.

* * * * *